Patented Jan. 19, 1932

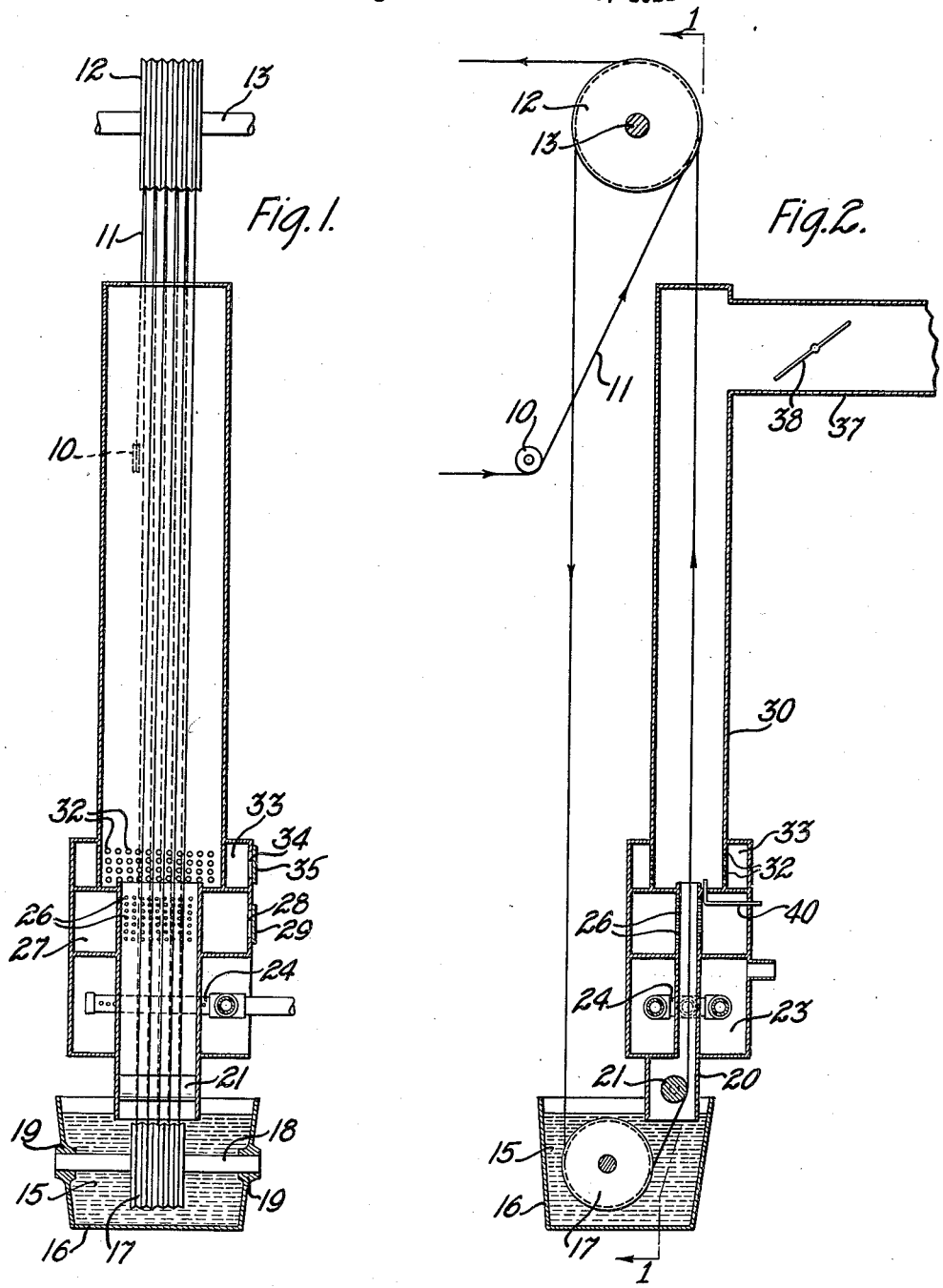

1,841,484

UNITED STATES PATENT OFFICE

HENRY MARTIN LARSEN, OF LA GRANGE, ILLINOIS, ASSIGNOR TO WESTERN ELECTRIC COMPANY, INCORPORATED, OF NEW YORK, N. Y., A CORPORATION OF NEW YORK

PROCESS OF TREATING MATERIALS

Application filed November 30, 1926, Serial No. 151,624. Renewed September 9, 1931.

This invention relates to a process of treating materials, and more particularly to a process of treating material applied to a core in strand form.

Objects of the invention are the provision of a simple and effective process of hardening material applied to a core in strand form.

Other objects are the provision of a process of treating enamel insulated wire efficiently and with great rapidity, and in consequence at a minimum cost of production.

Further objects of the invention are the provision of a practical process of enameling wire requiring little or no applied heat.

In one embodiment of the invention, a wire is passed through a composition composed of a substantially non-combustible insulating material combined with suitable volatile, combustible substances whereby a coating adheres to the wire. As the wire emerges from the composition it is passed through a heated, substantially oxygen-free zone where some of the substances are vaporized to render them more inflammable. It next passes through a zone where air is admitted and the vapors are ignited, whereupon the insulating material is baked or hardened upon the wire by the heat of combustion of the combustible substances in the coating composition.

Further objects and features of the invention will be apparent from the following detailed description and accompanying drawings illustrating one embodiment of the invention, in which Fig. 1 is a vertical sectional view of an insulating device taken substantially on the line 1—1 of Fig. 2, and Fig. 2 is a transverse vertical sectional view of the insulating apparatus.

The accompanying drawings, in which like numerals designate similar parts throughout the several views, illustrate an apparatus for insulating wires of relatively great length, which embodies features of the invention and which may be used in practicing the improved method. In this embodiment of the invention there is provided a sheave 10 around which a wire 11 which is to be insulated passes from a supply reel (not shown) to a large cylindrical grooved pulley 12 fixedly mounted upon a shaft 13 which is driven in any suitable manner. The wire 11 passes over and around the pulley 12 and then downwardly into an insulating composition 15 contained in a vessel 16 in which is mounted a cylindrical grooved pulley 17 upon a shaft 18 which is secured in bearings 19—19 provided in the walls of the vessel 16. Suspended within the composition contained in the vessel 16 is a tube 20 in the lower end of which is mounted a roller 21 for removing any excess composition from the wire. The tube 20 extends vertically through a heating chamber 23 in which is mounted a heating device of any suitable sort, such as a U-shaped gas burner 24, and is provided in that portion which extends above the heating chamber 23, with a plurality of openings 26—26. The portion of the tube 20 which is provided with the openings 26—26 is surrounded by a chamber 27 having an opening 28 leading to the atmosphere, adjacent which opening is mounted a valve plate 29 for regulating the amount of air which may enter the openings 28 and 26—26.

A combustion chamber 30 is connected to the upper end of the tube 20, which chamber is provided at its lower end with a plurality of holes 32—32. The lower end of the combustion chamber is surrounded by an air chamber 33 similar to chamber 27, and chamber 33 is provided with an opening 34 and a valve plate 35 for regulating the amount of air admitted thereto. Near the upper end of the combustion chamber 30 there is provided a flue pipe 37 for conducting away products of combustion, which pipe is provided with a damper 38 of any suitable type. A small L-shaped gas jet 40 which may be connected in any suitable manner to a gas main (not shown) extends through the chamber 27 and into the bottom of the combustion chamber 30 for the purpose of initially igniting combustible materials entering the chamber through the tube 20. Or a spark plug and gas engine ignition apparatus, or any suitable igniter known in the art, may be used for this purpose.

The operation of the apparatus is as follows: The wire 11 is passed from a suitable supply spool (not shown) around the sheave 10, over the pulley 12, down and around the pulley 17, over the roll 21, through the tube 20 and the combustion chamber 30, around the pulley 12, again down and around the pulley 17, and through the tube 20 and chamber 30 to the pulley 12. The wire is threaded around the various pulleys in this way several times, in the embodiment shown five times, and the last pass is drawn from the pulley 12 to a take-up device of any suitable type (not shown).

The vessel 15 is filled with an insulating composition consisting of a substantially non-combustible insulating material combined with any suitable volatile and combustible solvent or solvents to a level above the lower end of the tube 20. By the term "solvent", as used above and hereinafter in the specification and annexed claims, is meant any substance which will combine with the insulating material to form a true solution, an emulsion, a suspension or a mixture of any of these states of matter. An insulating composition which may be employed with satisfactory results is disclosed in the United States Patent No. 1,101,281, issued June 23, 1914, to H. B. Holmes et al., with the exception that the carbon tetrachloride contained therein may be omitted in order to increase the inflammability of the solvents. This composition with the carbon tetrachloride omitted comprises substantially 158 pounds of low grade or pitchy ozocerite, 16.5 pounds of commercially pure ozocerite, 11.5 gallons of castor-oil, 36.5 gallons of mineral oil of a specific gravity of .860, 19.5 gallons of asphaltum, 1 pound of glue, 40 gallons of turpentine and 42 gallons of kerosene. The gas from the burner 24 is ignited, the supply of gas to the tube 40 is so regulated that only a small jet of flame will extend from the end of the tube and the gas ignited to furnish a pilot light. Or the igniter or spark coil is put into operation for a few moments if such other ignition means is used instead of the pilot light.

The mechanisms driving the take-up device and the pulley 12 are started, when the wire 11 will be drawn through the insulating composition 15 and become coated thereby. A strand of the coated wire passes vertically from the composition directly into the tube 20 without access to the air and over the roller 21, where, by the wiping action of the roller, any excess of insulating composition is removed. The coated strand then passes upwardly through the tube 20 which is heated by the burner 24 and in which some of the volatile, combustible substances present in the coating on the wire are vaporized. Since the lower end of the tube 20 dips into the coating composition and the vapors produced in the heated zone of the tube 20 are burned above, this portion of the tube is substantially free of oxygen. The wire next travels past the openings 26 in the upper portion of the tube 20 where a supply of air sufficient to burn substantially all of the solvents in the coating is admitted and mixes with the vapors produced below. In the lower end of the combustion chamber 30 the mixture of vapors and air is ignited by means of the pilot flame of the jet 40 whereupon the solvents upon that portion of the wire passing, at that instant, through the lower portion of the combustion chamber become ignited, additional air being admitted into the combustion chamber through the openings 34 and 32—32. The damper 38 and the valve plates 29 and 35 are adjusted so that the flame produced by the combustion of the solvents is of a height which gives a satisfactory product. In the lower portion of the combustion chamber 30 substantially all of the solvents in the coating upon the wire are burned and sufficient heat is generated at this point to bake the insulating material firmly upon the wire. The wire now coated with a hard insulating substance passes upwardly through the upper portion of the combustion chamber and through the hot products of combustion therein, which are generated in the lower portion of the combustion chamber, whereby any remaining solvents in the coating are driven off and the insulating material is completely hardened upon the wire. The wire is then passed over the pulley 12 and again through the above outlined steps to add another coating of insulating material upon the wire and the wire is repassed through the apparatus until the insulating coating thereon has assumed a thickness sufficient for the use to which the wire is to be put.

One of the outstanding features of the invention is the elimination of apparatus for treating waste vapors, such as is usually necessary in apparatus for treating cores in strand form. In most apparatus of this sort, wires are coated with an insulating composition and are passed through externally heated ovens wherein the volatile portions of the composition are vaporized. It then becomes necessary to remove and treat these vapors in order to eliminate fire and health hazards, which operations require additional apparatus for their accomplishment. By utilizing the solvents in insulating compositions to furnish the heat necessary to harden portions of the composition upon conductors, this invention not only effects a large saving in fuel, but also eliminates fire and health hazards without any additional apparatus.

It will be seen from the above description that various characteristics of insulation may be obtained upon the wire by varying the conditions within the apparatus, which may be effected by changing the viscosity of or the per cent of solvent in the insulating solution, by changing the temperature within the heating chamber 23, by regulating the supply of air admitted to the chambers 27 and 33, by changing the position of the damper 38, and by varying the speed with which the wire is drawn through the apparatus. It is, of course, to be understood that the above embodiment is illustrative only and that various changes in the shape and proportions of the parts may be made without departing from the scope of the invention as defined in the appended claims.

What is claimed is:

1. The process of treating a core in strand form, which consists in coating the core with a material combined with a volatile combustible solvent, vaporizing a portion of the solvent, igniting the vapors of the solvent of the coating, and baking the material upon the core solely by means of the heat generated by the combustion of the solvent.

2. The process of treating a core in strand form, which consists in coating the core with a material combined with a volatile solvent, vaporizing a portion of the solvent out of contact with a flame to form a combustible gas surrounding the core, and igniting the gas to harden the material upon the core.

3. The process of treating a core in strand form, which consists in coating the core with an insulating material combined with a combustible solvent, heating the coated core out of contact with a flame to vaporize a portion of the solvent to render it more inflammable, and igniting the vapor to bake the material upon the core.

4. The process of treating a core in strand form, which consists in coating the core with an insulating material combined with a combustible solvent, passing the coated core through an enclosed heated zone to vaporize a portion of the solvent to render it more inflammable, and igniting the vapors of the solvent to bake the material upon the core.

5. The process of insulating electrical conductors, which consists in passing a conductor through a composition composed of insulating material combined with a volatile, combustible solvent, passing the coated conductor directly into a heated zone to vaporize a portion of the solvent to render it more inflammable, withdrawing the conductor from the heated zone, and igniting the vapors of the solvent to bake the insulating material upon the conductor.

6. The process of insulating electrical conductors, which consists in coating a conductor with a composition composed of insulating material combined with a combustible solvent, igniting the vapors of the solvent of the coating, and conveying the conductor in the direction of travel of the flame produced by the burning solvent while controlling the supply of combustion air to the flame.

7. The process of insulating electrical conductors, which consists in coating a conductor with a composition composed of insulating material combined with a combustible solvent, vaporizing a portion of the solvent, and conveying the coated conductor and the vaporized solvent through a combustion zone, in which the vapors of the solvent on the conductor are ignited and allowed to burn, the conductor being conveyed through the combustion zone in the direction of travel of the flame.

8. The process of insulating electrical conductors, which consists in coating the conductors with insulating material combined with volatile, combustible solvents, passing the coated conductors through a heated zone to vaporize a portion of the solvents to render them more inflammable, mixing the vapors with a sufficient quantity of air to burn substantially all of the solvent material in the coating, and igniting the mixture to bake the insulating material upon the conductors.

9. The process of insulating electrical conductors, which consists in passing a conductor through a body of liquid composition composed of insulating material combined with volatile, combustible solvents, conveying the coated conductor directly into and through a heated zone to vaporize a portion of the solvents to render them more inflammable, igniting the vapors of the solvents in the coating to harden the insulating material upon the conductor, and conveying the coated conductor through the hot products of combustion of the solvents to insure further hardening of the coating on the conductor.

10. The process of insulating electrical conductors, which consists in coating a conductor with a composition composed of insulating material combined with volatile, combustible solvents, conveying the coated conductor in a substantially vertical path directly into and through a heated zone to vaporize a portion of the solvents to render them more inflammable, adding a sufficient quantity of air to burn substantially all of the solvent material upon the conductor, conveying the conductor in a vertical path through a combustion zone, igniting the vapors of the solvents of the coating to harden the insulating material upon the conductors, and conveying the coated conductor through the hot products of combustion to insure further hardening of the coating on the conductor.

11. The process for treating cores in strand form, which consists in coating a core with a substantially non-combustible coating material combined with a more combustible substance, igniting the more combustible substance to burn the more combustible substance and to furnish substantially all of the heat necessary to consolidate the coating material upon the core, and controlling the sup- 12. The process for treating cores in strand form, which comprises coating a core with a composition composed of an insulator dissolved in a volatile combustible solvent, vaporizing a portion of the solvent from the coating out of contact with a flame, and igniting the vapor of the solvent in the coating to burn the solvent and to furnish substantially all of the heat necessary to harden the insulator upon the core.

13. The process for treating cores in strand form, which consists in coating a core with a substantially non-combustible coating material combined with a more combustible substance, supplying air to the zone surrounding the core, igniting the more combustible substance to burn the same and to thereby consolidate the coating material upon the core, and regulating the quantity of air supplied to control the characteristics of the final product.

14. The process for treating cores in strand form, which consists in coating a core with a substantially non-combustible coating material combined with a combustible solvent, passing the coated strand through an enclosed, heated zone to vaporize a portion of the solvent, supplying air to the zone surrounding the core, burning the vaporized solvent and the solvent upon the core to consolidate the coating material thereon, and regulating the quantity of air supplied to control the characteristics of the final product.

15. The process for treating cores in strand form, which consists in coating a core with a substantially non-combustible coating material mixed with a more combustible substance, vaporizing a portion of the more combustible substance in one zone, and igniting the more combustible substance in another zone to consolidate the coating material upon the strand.

16. The process for treating cores in strand form, which consists in coating a core with a substantially non-combustible coating material mixed with a combustible solvent, advancing the coated strand through a heated zone to vaporize a portion of the solvent, advancing the strand and vaporized solvent through a mixing zone, supplying air to the mixing zone to form a combustible mixture with the vaporized solvent, advancing the strand and the combustible mixture into a combustion zone, and igniting the mixture in the combustion zone to burn the solvent and to thereby furnish the heat necessary to consolidate the coating material upon the strand.

17. The process for treating cores in strand form, which consists in coating a core with a substantially non-combustible coating material mixed with a combustible solvent, advancing the coated strand through a heated zone to vaporize a portion of the solvent, advancing the strand and vaporized solvent through a mixing zone, supplying air to the mixing zone to form a combustible mixture with the vaporized solvent, advancing the strand and the combustible mixture into a combustion zone, igniting the mixture in the combustion zone to burn the solvent and to thereby harden the coating material upon the strand, and conveying the coated strand through the hot products of combustion to insure further hardening of the coating upon the strand.

18. The process for treating cores in strand form, which consists in coating a core with a substantially non-combustible material combined with a more combustible substance, heating the core out of contact with air to vaporize a portion of the more combustible substance, supplying air to the zone around the core, and igniting the resulting mixture to burn the more combustible substance and harden the material upon the core.

19. The process for treating cores in strand form, which consists in coating a core with an insulating material combined with a combustible solvent, passing the coated core through a heated, substantially oxygen-free zone to vaporize a portion of the solvent, mixing a combustion supporting medium with the vaporized solvent to form a combustible mixture, and igniting the mixture to bake the insulating material upon the core.

20. The process for treating cores in strand form, which consists in treating a core with an insulating material combined with a volatile, combustible solvent, passing the core through a heated zone to vaporize a portion of the solvent, and initially igniting the solvent as the core emerges from the heated zone whereupon the solvent progressively burns as the core continues to emerge from the heated zone and thereby hardens the insulating material upon the core.

21. The process for treating cores in strand form, which consists in coating a core with an insulating material combined with a volatile, combustible solvent, initially igniting the vapors of the solvent on the core, and utilizing the solvent as the sole fuel to support the resulting combustion thereby effecting a consolidation of the insulating material upon the core.

22. The process for insulating electrical conductors, which consists in passing a conductor through a mixture of an insulating material and a volatile combustible solvent, advancing the coated conductor directly into and through a heated zone to vaporize a portion of the solvent, supplying a sufficient quantity of air to burn substantially all of the solvent upon the conductor, and initially igniting the vapors of the solvent to institute combustion supported solely by the solvent as a fuel whereby the insulating material is consolidated upon the conductor.

23. The process for insulating electrical conductors in strand form, which consists in continuously advancing a conductor through a mixture of an insulating material and a combustible solvent, and continuously consolidating the insulating material upon the conductor concurrently with the application of the mixture thereto by initially igniting the vapors of the solvent and allowing the same to progressively burn as the conductor is withdrawn from the mixture.

24. A process for insulating electrical wires, which consists in continuously advancing a wire through a mixture of insulating material and a volatile, combustible solvent material, continuously advancing the coated wire through a heated zone to vaporize a portion of the solvent material, continuously advancing the wire from the heated zone into a combustion zone, and initially igniting the vapors of the solvent in the combustion zone whereupon the solvent burns progressively on the wire and progressively consolidates the insulating material thereon as the wire continues to be advanced into the combustion zone.

25. The process of insulating electrical conductors, which consists in coating the conductors with insulating material mixed with volatile combustible solvents, passing the coated conductors through a heated zone to vaporize a portion of the solvents to render them more inflammable, mixing the vapors with a sufficient quantity of air to burn substantially all of the solvent material in the coating, and burning the mixture to harden the insulating material upon the conductors.

26. The process of coating an article, which comprises applying to the article a relatively non-combustible coating material mixed with a more combustible substance, vaporizing a portion of the more combustible substance in one zone, and igniting the more combustible substance in another zone to consolidate the coating material upon the article.

27. The process of coating an article, which comprises applying to the article a coating consisting of a relatively non-combustible material mixed with a volatile combustible solvent, passing the coated article through a heated zone to vaporize a portion of the solvent to render it more inflammable, mixing the vapors with a sufficient quantity of air to burn substantially all of the solvent material in the coating, and burning the mixture in a different zone to harden the relatively non-combustible material upon the article.

In witness whereof, I hereunto subscribe my name this 17th day of November A. D. 1926.

HENRY MARTIN LARSEN.